United States Patent
Lo Cascio et al.

(10) Patent No.: US 11,459,501 B2
(45) Date of Patent: Oct. 4, 2022

(54) CHELATING ACID BLENDS FOR STIMULATION OF A SUBTERRANEAN FORMATION, METHODS OF UTILIZING THE CHELATING ACID BLENDS, AND HYDROCARBON WELLS THAT INCLUDE THE CHELATING ACID BLENDS

(71) Applicant: ExxonMobil Upstream Research Company, Spring, TX (US)

(72) Inventors: Mauro Lo Cascio, Houston, TX (US); Pavlin B. Entchev, Spring, TX (US); Timothy J. Hall, Pinehurst, TX (US); P. Matthew Spiecker, Manvel, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 0 days.

(21) Appl. No.: 17/166,053

(22) Filed: Feb. 3, 2021

(65) Prior Publication Data
US 2021/0324260 A1 Oct. 21, 2021

Related U.S. Application Data

(60) Provisional application No. 63/011,361, filed on Apr. 17, 2020.

(51) Int. Cl.
*E21B 43/27* (2006.01)
*C09K 8/74* (2006.01)

(52) U.S. Cl.
CPC .............. *C09K 8/74* (2013.01); *E21B 43/27* (2020.05)

(58) Field of Classification Search
CPC . C09K 8/74; E21B 43/27; E21B 43/26; E21B 43/16
See application file for complete search history.

(56) References Cited

U.S. PATENT DOCUMENTS

| | | | | |
|---|---|---|---|---|
| 3,868,998 A | * | 3/1975 | Lybarger | C09K 8/72 166/278 |
| 5,507,342 A | * | 4/1996 | Copeland | C09K 8/72 166/279 |
| 2004/0254079 A1 | * | 12/2004 | Frenier | C09K 8/74 507/260 |
| 2009/0192057 A1 | * | 7/2009 | Frenier | C09K 8/74 507/235 |

(Continued)

*Primary Examiner* — Silvana C Runyan
(74) *Attorney, Agent, or Firm* — Leandro Arechederra, III (57) ABSTRACT

Chelating acid blends for stimulation of a subterranean formation, methods of utilizing the chelating acid blends, and hydrocarbon wells that include the chelating acid blends are disclosed herein. The chelating acid blends include an acid mixture and a chelating agent or set of chelating agents. The acid mixture includes hydrochloric acid and hydrofluoric acid. The methods include providing the chelating acid blends to a wellbore of a hydrocarbon well, flowing the chelating acid blends into a subterranean formation, dissolving a fraction of a formation mineralogy of the subterranean formation with the acid mixture, and chelating poly-valent metal ions with the chelating agent. The hydrocarbon wells include a wellbore that extends within a subterranean formation, a downhole tubular that extends within the wellbore, a fracture that extends into the subterranean formation, and a chelating acid blend positioned within the fracture.

16 Claims, 3 Drawing Sheets

(56) References Cited

U.S. PATENT DOCUMENTS

| | | | | |
|---|---|---|---|---|
| 2010/0276152 | A1* | 11/2010 | De Wolf | C11D 7/265 |
| | | | | 166/308.2 |
| 2012/0055675 | A1* | 3/2012 | Noui-Mehidi | E21B 43/16 |
| | | | | 166/307 |
| 2014/0367108 | A1* | 12/2014 | Chung | C09K 8/887 |
| | | | | 166/305.1 |
| 2015/0344771 | A1* | 12/2015 | Jiang | C09K 8/86 |
| | | | | 166/305.1 |
| 2017/0198195 | A1* | 7/2017 | Beuterbaugh | E21B 43/267 |
| 2017/0362498 | A1* | 12/2017 | Jackson | C09K 8/528 |

* cited by examiner

CHELATING ACID BLENDS FOR STIMULATION OF A SUBTERRANEAN FORMATION, METHODS OF UTILIZING THE CHELATING ACID BLENDS, AND HYDROCARBON WELLS THAT INCLUDE THE CHELATING ACID BLENDS

CROSS-REFERENCE TO RELATED APPLICATIONS

This application claims the benefit of U.S. Provisional Application No. 63/011,361, filed Apr. 17, 2020, the disclosure of which is herein incorporated by reference in its entirety.

FIELD OF THE INVENTION

The present disclosure relates generally to chelating acid blends and more specifically to chelating acid blends for stimulation of a subterranean formation, for methods of utilizing the chelating acid blends to stimulate a subterranean formation, and/or to hydrocarbon wells that include the chelating acid blends.

BACKGROUND OF THE INVENTION

Hydraulic fracturing may be utilized to fracture a subterranean formation and thereby to increase a production rate of hydrocarbon fluids therefrom. Fractures generated by hydraulic fracturing operations may be hundreds, or even thousands, of feet long. Propping operations may be utilized to prop open the fractures subsequent to formation thereof; however, it generally is not feasible to position proppant in, or to prop open, the entire length of the fractures. As such, only a small fraction of the length and height of the fractures generated may contribute to the production of the wellbore.

Other technologies also have been utilized to increase fracture conductivities. One example of such technologies is acid stimulation operations, which may reach farther into the fractures than proppant. However, conventional acid stimulation operations suffer from a number of limitations. For example, the chemistry of conventional acid stimulation operations must be carefully matched to a formation mineralogy of the subterranean formation. Failure to do so may result in precipitation of mineral scale, asphaltenes, and possibly other forms of metal complexes from the acid solution. These solids deposit within the fractures, limiting and/or blocking fluid flow therethrough. This fact limits the process window within which a given acid may be utilized and/or means certain formation mineralogies cannot readily be stimulated by acidization. Acid stimulation operations would benefit significantly from increased process windows and/or applicability to a wider range of formation mineralogies. Thus, there exists a need for improved acid stimulation technologies that apply to a wide range of formation mineralogies, including complex carbonate-clastic mixed conventional and unconventional reservoirs.

SUMMARY OF THE INVENTION

Chelating acid blends for stimulation of a subterranean formation, methods of utilizing the chelating acid blends, and hydrocarbon wells that include the chelating acid blends are disclosed herein. The chelating acid blends include an acid mixture and a chelating agent or mixtures of chelating agents. The acid mixture includes at least hydrochloric acid and hydrofluoric acid. The chelating agent may be selected to decrease the potential for precipitation of scale and to inhibit the formation of metal ion complexes that may precipitate during changes in pH or redox conditions when the chelating acid blend reacts with the formation mineralogy. The chelating acid blend also may decrease the reaction rate of the acid mixture with the formation mineralogy, and this retarded effect may allow the chelating acid blend to penetrate further into the fracture and the formation porous network.

The methods include providing the chelating acid blends to a wellbore of a hydrocarbon well that extends within a subterranean formation. The methods also include flowing the chelating acid blends into the subterranean formation via the wellbore. The methods further include dissolving a fraction of a formation mineralogy of the subterranean formation with the acid mixture to increase a fracture fluid conductivity of a fracture that extends within the subterranean formation. The methods also include chelating, with the chelating agent, poly-valent metal ions released during the dissolving. The chelating decreases a potential for precipitation of metal complexes, which include the poly-valent metal ions, within the subterranean formation.

The hydrocarbon wells include a wellbore that extends within a subterranean formation. The hydrocarbon wells also include a downhole tubular that extends within the wellbore and defines a tubular conduit and a perforation. The hydrocarbon wells further include a fracture, or a system of fractures, that extends from proximate the perforation and into the subterranean formation. The methods also include a chelating acid blend positioned within the fracture.

DETAILED DESCRIPTION OF THE INVENTION

FIGS. 1-4 provide examples of chelating acid blends 90, of hydrocarbon wells 10 that include the chelating acid blends, and/or of methods 100 of stimulating subterranean formations, according to the present disclosure. Elements that serve a similar, or at least substantially similar, purpose are labeled with like numbers in each of FIGS. 1-4, and these elements may not be discussed in detail herein with reference to each of FIGS. 1-4. Similarly, all elements may not be labeled in each of FIGS. 1-4, but reference numerals associated therewith may be utilized herein for consistency. Elements, components, and/or features that are discussed herein with reference to one or more of FIGS. 1-4 may be included in and/or utilized with any of FIGS. 1-4 without departing from the scope of the present disclosure. In general, elements that are likely to be included in a particular embodiment are illustrated in solid lines, while elements that are optional are illustrated in dashed lines. However, elements that are shown in solid lines may not be essential and, in some embodiments, may be omitted without departing from the scope of the present disclosure.

Figure 1:
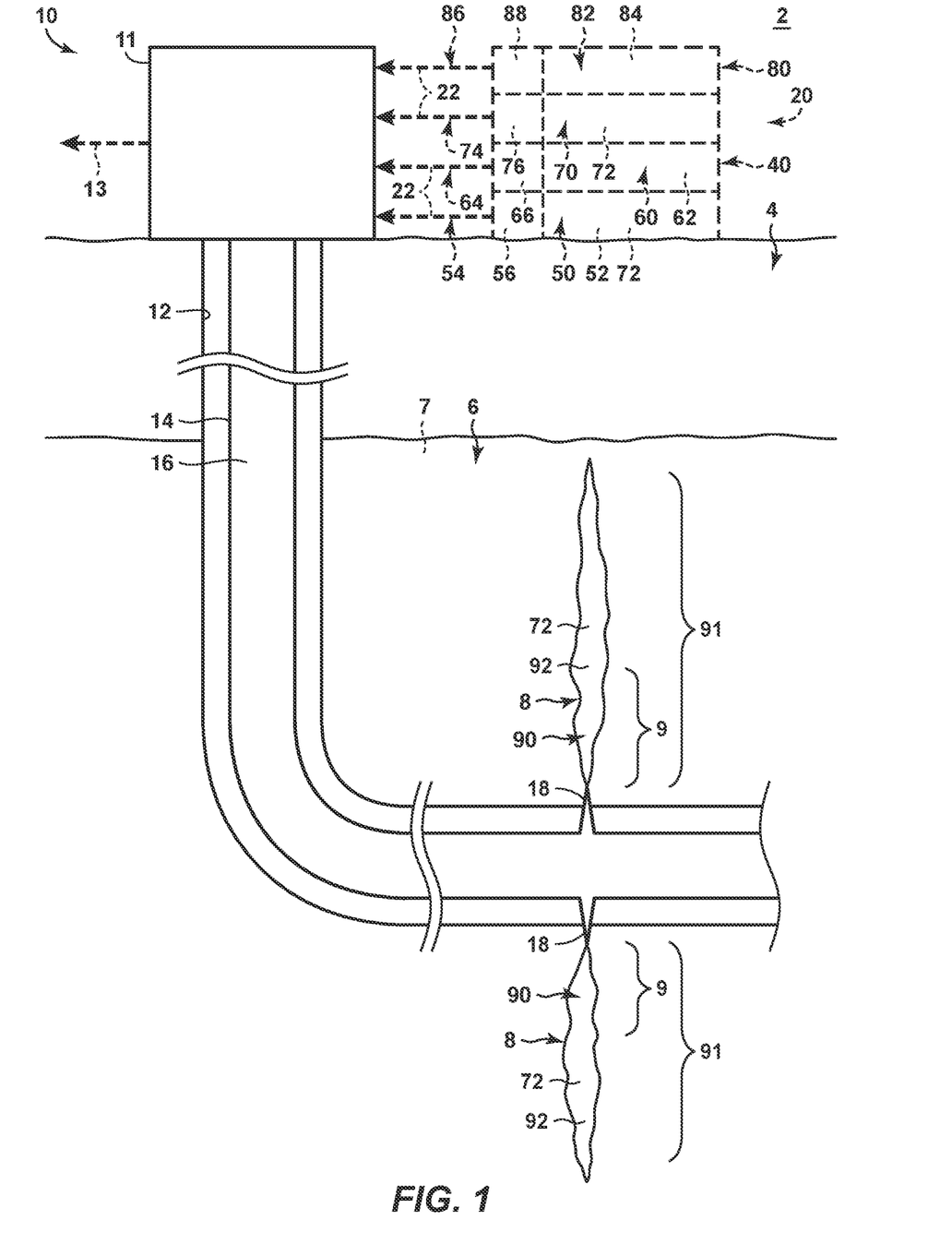
FIG. 1 is a schematic illustration of examples of a hydrocarbon well that may include a chelating acid blend, according to the present disclosure.

FIG. 1 is a schematic illustration of examples of a hydrocarbon well 10 that may include a chelating acid blend 90, according to the present disclosure, such as when methods of stimulating the subterranean formation are being performed. Hydrocarbon wells 10 include a wellbore 12 that extends within a subsurface region 4. Wellbore 12 also may be referred to herein as extending within a subterranean formation 6 of the subsurface region and/or as extending between a surface region 2 and the subterranean formation. Subterranean formation 6 may have a formation mineralogy and may include and/or contain hydrocarbon fluids 7.

Hydrocarbon well 10 also includes a downhole tubular 14 that extends within wellbore 12. Downhole tubular 14 forms, defines, and/or bounds a tubular conduit 16 and includes at least one perforation 18. Hydrocarbon well 10 further includes at least one fracture 8. Fracture 8 extends from, or from proximate, perforation 18, or a corresponding perforation 18, and into subterranean formation 6. Although not required to all implementations of the disclosed technology, hydrocarbon well 10 typically includes a plurality of perforations 18 and a corresponding plurality of fractures 8. As discussed in more detail herein, fractures 8 are utilized to increase fluid flow within subterranean formation 6, such as to permit production of, facilitate production of, and/or increase a flow rate of hydrocarbon fluids 7 that may be produced from the subterranean formation in and/or within a produced fluid stream 13.

During stimulating operations according to the present disclosure, hydrocarbon well 10 also includes a chelating acid blend 90. As discussed in more detail herein, chelating acid blend 90 includes an acid mixture 92 and a chelating agent 72. The acid mixture includes hydrochloric acid and hydrofluoric acid. The chelating agent may be selected to decrease a potential for precipitation of metal ion complexes from the chelating acid blend upon reaction of the chelating acid blend with the formation mineralogy of subterranean formation 6. Additionally or alternatively, the chelating agent may be selected to decrease a reaction rate of the acid mixture with the formation mineralogy.

As also discussed in more detail herein, the combination of hydrochloric acid, hydrofluoric acid, and the chelating agent within chelating acid blend 90 may permit and/or facilitate utilization of the chelating acid blend to stimulate a wide variety of formation mineralogies without, or with a decreased potential for, precipitation of metal complexes from the acid solution. This decrease, or elimination, of metal complex precipitation may be produced and/or generated by the inclusion of the chelating agent within the chelating acid blend and may cause chelating acid blends 90, according to the present disclosure, to be significantly more effective when compared with conventional acid stimulation methodologies that my utilize hydrochloric acid and/or hydrofluoric acid but that do not utilize the combination of hydrochloric acid, hydrofluoric acid, and chelating agent included within chelating acid blend 90.

As schematically illustrated in FIG. 1, chelating acid blend 90 is positioned within fracture 8 and may be configured to increase a fracture fluid conductivity of the fracture, as discussed in more detail herein. Stated another way, the presence of chelating acid blend 90 within fracture 8, or treatment of fracture 8 utilizing chelating acid blend 90 may decrease a resistance to fluid flow, within the fracture, when compared to a comparable fracture that has not been exposed to, or treated with, the chelating acid blend.

Figure 2:
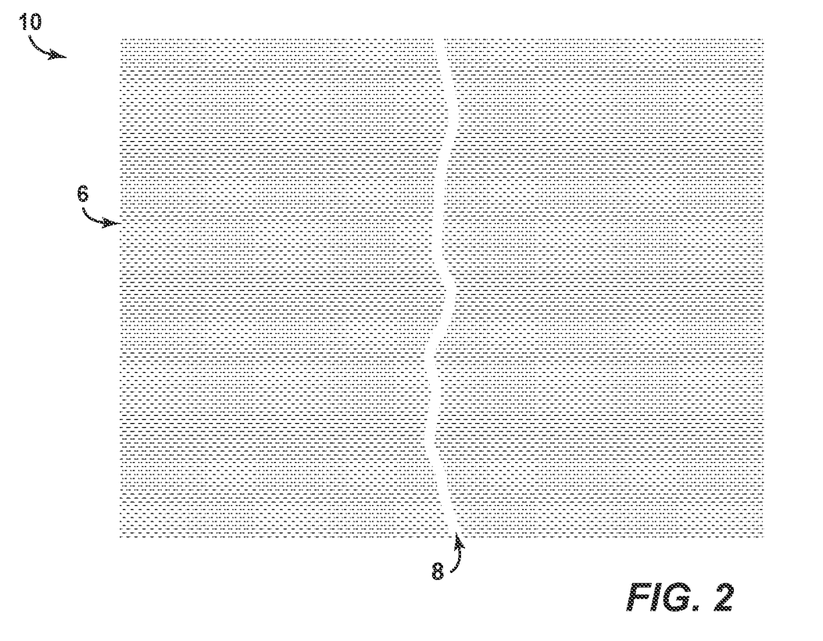
FIG. 2 is a schematic illustration of an example of a fracture prior to exposure to a chelating acid blend, according to the present disclosure.
Figure 3:
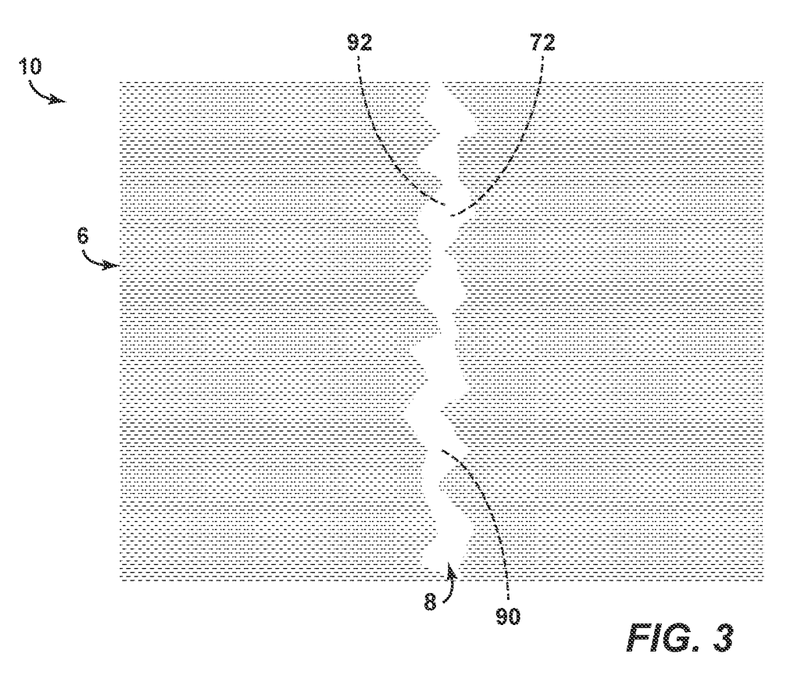
FIG. 3 is a schematic illustration of an example of the fracture of FIG. 2 subsequent to exposure to the chelating acid blend, according to the present disclosure.

As an example, FIG. 2 schematically illustrates fracture 8 that extends within subterranean formation 6 before exposure to, or treatment with, chelating acid blends 90 according to the present disclosure. In contrast, FIG. 3 schematically illustrates fracture 8 subsequent to exposure to, or treatment with, chelating acid blend 90 according to the present disclosure. As schematically illustrated by the transition from FIG. 2 to FIG. 3, chelating acid blend 90 dissolves a fraction of the formation mineralogy of subterranean formation 6, thereby increasing a size, a volume, a cross-sectional area for fluid flow, and/or the fracture fluid conductivity of fracture 8. This increase in fracture fluid conductivity upon exposure to chelating acid blend 90 may, as examples, be caused by dissolution and/or acidation of faces and/or tips of subterranean formation 6 that define the fracture.

As illustrated in dashed lines in FIG. 1, hydrocarbon well 10 also may include a fluid supply system 20. Fluid supply system 20, when present may be configured to provide at least one fluid stream 22 to subterranean formation 6, such as via wellbore 12, downhole tubular 14, and/or tubular conduit 16 thereof. As an example, fluid supply system 20 may provide fluid stream 22 to tubular conduit 16. The fluid stream may flow, within the tubular conduit, to perforations 18 and then may flow into subterranean formation 6 via perforations 18. As another example, fluid supply system 20 may provide the at least one fluid stream 22 to a wellhead 11 of hydrocarbon well 10, and wellhead 11 may provide the at least one fluid stream to the subterranean formation.

In some examples, fluid supply system 20 may include and/or be a chelating acid blend supply system 40. Chelating acid blend supply system 40, when present, may be configured to provide the one or more fluid streams 22, which may include chelating acid blend 90 and/or may combine to form the chelating acid blend, to subterranean formation 6, such as via tubular conduit 16. Additionally or alternatively, fluid streams 22 may be selected to form chelating acid blend 90 within wellbore 12, within subterranean formation 6, and/or subsequent to supplying the one or more fluid streams 22 to subterranean formation 6.

As illustrated in dashed lines in FIG. 1, chelating acid blend supply system 40 may include a hydrochloric acid supply tank 50. Hydrochloric acid supply tank 50, when present, may be configured to store, to contain, and/or to house a volume of hydrochloric acid 52. In some examples, chelating acid blend supply system 40 also may include a hydrochloric acid supply conduit 54, which may be configured to provide one or more fluid streams 22, which include hydrochloric acid 52, to subterranean formation 6, such as via tubular conduit 16. In some such examples, chelating acid blend supply system 40 further may include a hydrochloric acid pump 56. Hydrochloric acid pump 56, when present, may be configured to provide a motive force for supply of the hydrochloric acid to the subterranean formation.

When chelating acid blend supply system 40 includes hydrochloric acid supply tank 50, the hydrochloric acid supply tank also may be configured to store a volume of a chelating agent 72. In such a configuration, the volume of hydrochloric acid may be mixed with the volume of the chelating agent, and the mixture of the hydrochloric acid and the chelating agent may be less reactive, may be less dangerous, and/or may have a slower reaction rate when compared to a comparable volume of hydrochloric acid that is not mixed with the volume of the chelating agent. Such a configuration may cause chelating acid blend 90 to be less reactive while within wellbore 12 and/or may increase a potential for chelating acid blend 90 to flow farther into fracture 8 from wellbore 12 prior to being fully reacted, or spent. Stated another way, the mixture of hydrochloric acid 52 and chelating agent 72, prior to supply of the hydrochloric acid and the chelating agent to wellbore 12, may increase a length of fracture 8 that is treated by the chelating acid blend, thereby improving the fracture fluid conductivity of the fracture over a longer distance when compared to an acid treatment operation that provides hydrochloric acid that is not mixed with a corresponding chelating agent to a fracture.

As also illustrated in dashed lines in FIG. 1, chelating acid blend supply system 40 may include a hydrofluoric acid supply tank 60. Hydrofluoric acid supply tank 60, when present, may be configured to store, to contain, and/or to house a volume of a precursor material 62. Precursor material 62 may be selected to react with hydrochloric acid 52 to produce and/or generate hydrofluoric acid. Examples of precursor material 62 include ammonium fluoride, ammonium bifluoride, and/or a mixture of monoethanolamine and hydrofluoric acid. Additionally or alternatively, precursor material 62 may include and/or be hydrofluoric acid.

In some examples, chelating acid blend supply system 40 also may include a hydrofluoric acid supply conduit 64, which may be configured to provide one or more fluid streams 22, which include precursor material 62, to subterranean formation 6, such as via tubular conduit 16. In some such examples, chelating acid blend supply system 40 further may include a hydrofluoric acid pump 66. Hydrofluoric acid pump 66, when present, may be configured to provide a motive force for supply of the hydrofluoric acid to the subterranean formation.

As also illustrated in dashed lines in FIG. 1, chelating acid blend supply system 40 may include a chelating agent supply tank 70. Chelating agent supply tank 70, when present, may be configured to store, to contain, and/or to house a volume of chelating agent 72. In some examples, chelating acid blend supply system 40 also may include a chelating agent supply conduit 74, which may be configured to provide one or more fluid streams 22, which include chelating agent 72, to subterranean formation 6, such as via tubular conduit 16. In some such examples, chelating acid blend supply system 40 further may include a chelating agent pump 76. Chelating agent pump 76, when present, may be configured to provide a motive force for supply of the chelating agent to the subterranean formation.

As also illustrated in dashed lines in FIG. 1, fluid supply system 20 may include a water supply system 80, which also may be referred to as a pad water. Water supply system 80, when present, may be configured to provide, or to selectively provide, water 82 to subterranean formation 6, such as via tubular conduit 16. In some examples, water supply system 80 may include a water source 84, which may contain a volume of water 82. Examples of water source 84 include a water tank, a water well, a water supply pipe, and/or subsurface region 4. In some examples, water supply system 80 may include a water supply conduit 86, which may be configured to provide one or more fluid streams 22, which include water 82, to subterranean formation 6, such as via tubular conduit 16. In some such examples, water supply system 80 further may include a water pump 88. Water pump 88, when present, may be configured to provide a motive force for supply of the water to the subterranean formation.

It is within the scope of the present disclosure that fluid supply system 20 may include one or more additional pipes, conduits, valves, controllers, and/or other fluid flow-control devices that may be incorporated into the fluid supply system in any suitable manner. As examples, the additional pipes, conduits, valves, controllers, and/or other fluid flow-control devices may be included in and/or may form a portion of chelating acid blend supply system 40, such as to control, to regulate, to selectively control, and/or to selectively regulate a flow, or a flow rate, of hydrochloric acid 52, precursor material 62, and/or chelating agent 72 to subterranean formation 6. As another example, the additional pipes, conduits, valves, controllers, and/or other fluid flow-control devices may be included in and/or may form a portion of water supply system 80, such as to control, to regulate, to selectively control, and/or to selectively regulate a flow, or a flow rate, of water 82 to subterranean formation 6.

Figure 4:
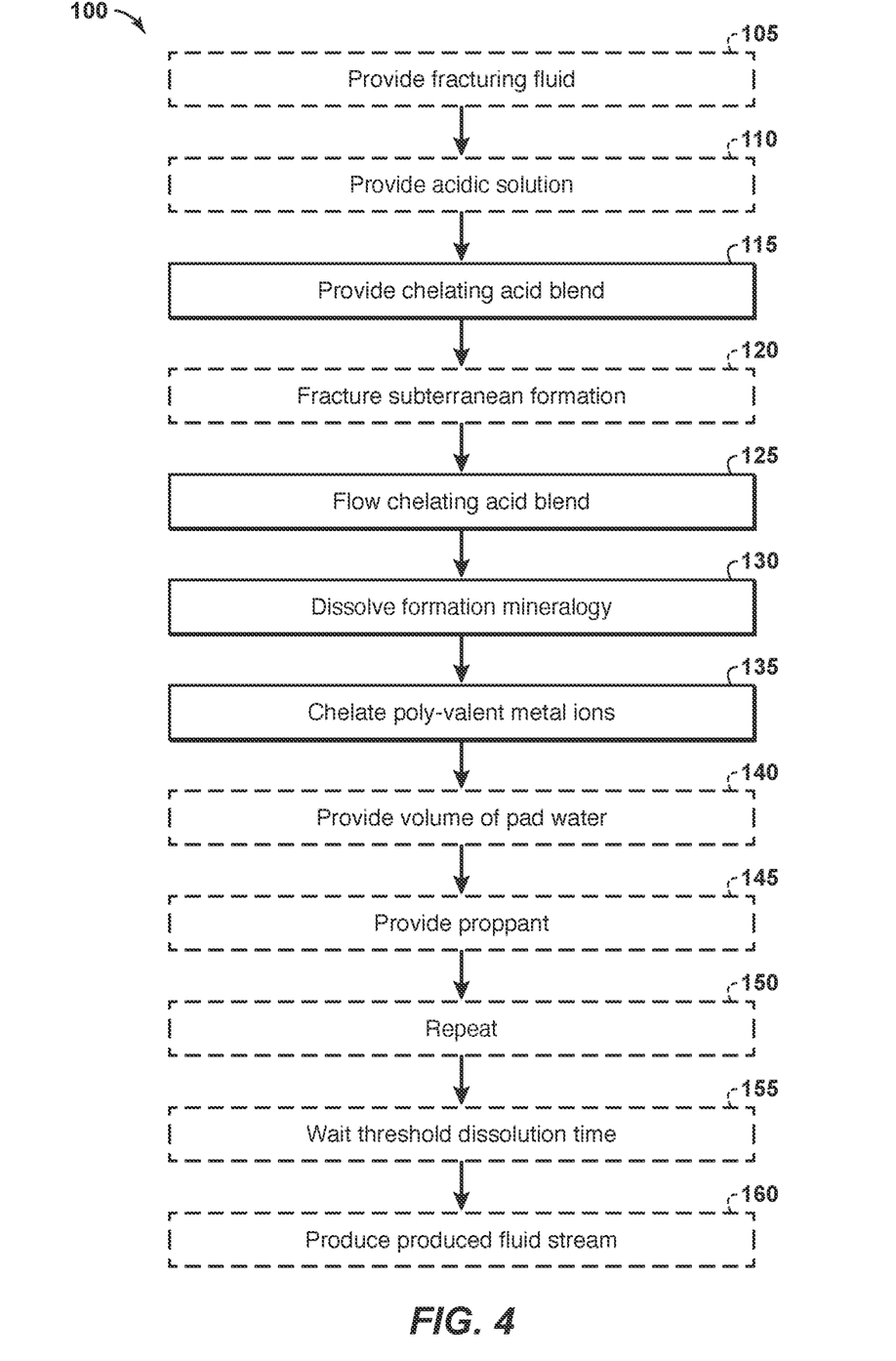
FIG. 4 is a flowchart illustrating examples of methods of stimulating a subterranean formation, according to the present disclosure.

As discussed in more detail herein with reference to methods 100 of FIG. 4, and in some examples, chelating acid blend 90 may be provided to subterranean formation 6 at a flow rate that is less than a flow rate at which water 82 is provided to the subterranean formation. With this in mind, water pump 88 of water supply system 80 may be configured to pump water 82 at a water flow rate that is greater than a combined flow rate at which hydrochloric acid pump 56 is configured to pump hydrochloric acid 52, hydrofluoric acid pump 66 is configured to pump precursor material 62, and chelating agent pump 76 is configured to pump chelating agent 72. As examples, a ratio of the water flow rate to the combined flow rate may be at least 2, at least 4, at least 6, at least 8, at least 10, at most 20, at most 18, at most 16, at most 14, at most 12, and/or at most 10. Such a configuration may permit and/or facilitate improved, or increased, contact time between chelating acid blend 90 and subterranean formation 6 when the chelating acid blend is provided to the subterranean formation.

FIG. 4 is a flowchart illustrating examples of methods 100 of stimulating a subterranean formation, according to the present disclosure. Examples of the subterranean formation are disclosed herein with reference to subterranean formation 6 of FIGS. 1-3. Methods 100 may include providing a fracturing fluid at 105 and/or providing an acidic solution at 110, and methods 100 include providing a chelating acid blend at 115. Methods 100 also may include fracturing the subterranean formation at 120, and methods 100 include flowing the chelating acid blend at 125, dissolving a formation mineralogy at 130, and chelating poly-valent metal ions at 135. Methods 100 further may include providing a volume of pad water at 140, providing a proppant at 145, repeating at least a portion of the methods at 150, waiting a threshold dissolution time at 155, and/or producing a produced fluid stream at 160.

Providing the fracturing fluid at 105 may include providing any suitable fracturing fluid to the wellbore and/or to the subterranean formation in any suitable manner. As an example, the providing at 105 may include providing the fracturing fluid at a fluid supply pressure that is sufficient to fracture the subterranean formation and/or to form the fracture within the subterranean formation.

When methods 100 include both the providing at 105 and the providing at 115, the providing at 105 may include providing the fracturing fluid at a fracturing fluid flow rate and the providing at 115 may include providing the chelating acid blend at a chelating acid blend flow rate that is less than the fracturing fluid flow rate. As examples, the chelating acid blend flow rate may be at most 5%, at most 10%, at most 15%, at most 20%, at most 25%, at most 30%, at most 35%, at most 40%, at most 45%, and/or at most 50% of the fracturing fluid flow rate. Such a configuration may permit and/or facilitate improved, or increased, contact time between the chelating acid blend and the subterranean formation when the chelating acid blend is provided to the subterranean formation.

As discussed herein with reference to hydrocarbon well 10 of FIG. 1, a downhole tubular 14 may extend within a wellbore 12 and may define a tubular conduit 16. In such a configuration, the providing at 105 may include providing the fracturing fluid to the tubular conduit of the downhole tubular. Also in such a configuration, the downhole tubular may include one or more perforations, as indicated in FIG. 1 at 18, and the fracturing fluid may flow from the tubular conduit and into the subterranean formation through and/or via the one or more perforations.

Providing the acidic solution at 110 may include providing the acidic solution to the wellbore, to the tubular conduit, and/or to the subterranean formation. The acidic solution may be separate, distinct, and/or chemically distinct from the chelating acid blend. As an example, the acidic solution may include a different acid when compared to the chelating acid blend, may not include the chelating agent, and/or may be free of the chelating agent. The providing at 110 may be performed with any suitable timing and/or sequence during methods 100. As examples, the providing at 110 may be performed prior to the providing at 115, during the fracturing at 120, and/or subsequent to the fracturing at 120.

The providing at 110, when performed, may prepare the wellbore for the chelating acid blend that is provided during the providing at 115 and/or may be utilized to increase a potential for the chelating acid blend to react within one or more desired portion(s) of the subsurface region. As an example, the acidic solution may react with materials present within the wellbore that otherwise would react with the chelating acid blend, thereby decreasing a potential for reaction of the chelating acid blend within the wellbore. As another example, the providing at 110 may be utilized to clean the wellbore. As yet another example, and as discussed in more detail herein, the downhole tubular may include perforations. In such a configuration, the providing at 110 may include cleaning the perforations and/or decreasing a resistance to fluid flow through the perforations with, via, and/or utilizing the acidic solution.

Providing the chelating acid blend at 115 may include providing any suitable chelating acid blend, or chelating acid blend stream that includes the chelating acid blend, to the wellbore, to the tubular conduit, and/or to the subterranean formation. This may include providing the chelating acid blend with, via, and/or utilizing a chelating acid blend supply system, examples of which are disclosed herein. Examples of the chelating acid blend are disclosed herein and include chelating acid blends that include an acid blend, which includes hydrochloric acid and hydrofluoric acid, and a chelating agent.

In some examples, the providing at 115 may include providing two or more separate fluid streams to the wellbore, and the two or more separate fluid streams may mix and/or combine within the wellbore and/or within the subterranean formation to form and/or define the chelating acid blend. As an example, the providing at 115 may include providing a hydrochloric acid stream, which includes hydrochloric acid, to the wellbore and also providing a separate precursor material stream, which includes precursor material, to the wellbore. The precursor material may be selected and/or formulated to react with the hydrochloric acid to produce and/or generate the hydrofluoric acid. Examples of the hydrochloric acid and the precursor material are disclosed herein. In some such examples, methods 100 further may include combining the hydrochloric acid stream and the precursor material stream, within the wellbore, to produce and/or generate the chelating acid blend within the wellbore. The hydrochloric acid stream also may include the chelating agent. Additionally or alternatively, the providing at 115 may include providing a separate chelating agent stream, which includes the chelating agent, to the wellbore. Methods 100 then may include combining the hydrochloric acid stream, the precursor material stream, and the chelating agent stream, within the wellbore, to produce and/or generate the chelating acid blend within the wellbore.

Additionally or alternatively, the providing at 115 may include providing the chelating acid blend, as a mixture, to the wellbore. Additionally or alternatively, the hydrochloric acid, the precursor material, and the chelating agent may be combined, external to the wellbore, and subsequently provided to the wellbore during the providing at 115.

Fracturing the subterranean formation at 120 may include creating and/or generating the one or more fractures in and/or within the subterranean formation. When methods 100 include the providing at 105, the fracturing at 120 may be subsequent and/or responsive to the providing at 105. Additionally or alternatively, the providing at 115 may include providing the chelating acid blend at a blend supply pressure sufficient to form the one or more fractures within the subterranean formation. In such a configuration, the fracturing at 120 may be subsequent and/or responsive to the providing at 115.

Flowing the chelating acid blend at 125 may include flowing the chelating acid blend into the subterranean formation via the wellbore and/or via the tubular conduit of the downhole tubular. This may include flowing the chelating acid blend within the tubular conduit and into the subterranean formation and/or into the one or more fractures via one or more perforations that may be defined within the downhole tubular.

The providing at 115 may include providing the chelating acid blend at a chelating acid blend supply flow rate, and the flowing at 125 may include flowing the chelating acid blend into the subterranean formation at a chelating acid blend formation-contacting flow rate that is less than the chelating acid blend supply rate. As examples, the chelating acid blend formation-contacting flow rate may be at most 5%, at most 10%, at most 15%, at most 20%, at most 25%, at most 30%, at most 35%, at most 40%, at most 45%, or at most 50% of the chelating acid blend supply flow rate. Such a configuration may increase a contact time between the chelating acid blend and the regions of the subterranean formation that form and/or define the one or more fractures. Additionally or alternatively, such a configuration may decrease a potential for reaction of the chelating acid blend within and/or proximate the wellbore.

Dissolving the formation mineralogy at 130 may include dissolving a fraction, or a subset, of the formation mineralogy of the subterranean formation with and/or within the acid mixture of the chelating acid blend. Stated another way, the dissolving at 130 may include reacting the acid mixture with the formation mineralogy. As discussed in more detail herein, one or more fractures may extend within the subterranean formation, and the providing at 115 may include providing the chelating acid blend to the one or more fractures and/or the flowing at 125 may include flowing the chelating acid blend into and/or within the one or more fractures. With this in mind, the dissolving at 130 may include dissolving to increase a fracture fluid conductivity of the one or more fractures and/or to increase a drained volume that is drained by the one or more fractures, such as by generating a longer conductive length of the one or more fractures and/or by generating a rugose fracture morphology. As examples, the dissolving at 130 may include acidizing faces of the one or more fractures and/or acidizing tips of the one or more fractures.

Chelating poly-valent metal ions at 135 may include chelating, or complexing, the poly-valent metal ions with the chelating agent of the chelating acid blend. The poly-valent metal ions may be released into the subterranean formation, into the one or more fractures, and/or into the chelating acid blend during the dissolving at 130, and the chelating at 135 may include chelating to decrease a potential for precipitation of metal complexes, which include the poly-valent metal ions, within the subterranean formation and/or within the one or more fractures.

As discussed in more detail herein, in the presence of hydrofluoric and/or hydrochloric acid, but in the absence of the chelating agent, the poly-valent metal ions may form metal complexes that may precipitate within the one or more fractures. Precipitation of the metal complexes within the one or more fractures may decrease the fracture fluid conductivity of the one or more fractures and/or may decrease the conductive length of the one or more fractures. The chelating agent included within chelating acid blends, according to the present disclosure, may decrease and/or eliminate this metal complex precipitation. As such, chelating acid blends, according to the present disclosure, may provide significant improvements in the fracture fluid conductivity of the one or more fractures and/or in the drained volume that is drained by the one or more fractures when compared to conventional acid stimulation operations.

Providing the volume of pad water at 140 may include providing the volume of pad water to the wellbore, to the tubular conduit, and/or to the subterranean formation. This may include providing the pad water with, via, and/or utilizing a water supply system, examples of which are disclosed herein. The providing at 140 may include providing the volume of pad water to the wellbore to flush, or to convey, the chelating acid blend from the wellbore and/or to push the chelating acid blend farther into the one or more fractures, deeper into the one or more fractures, and/or farther from the wellbore and within the one or more fractures. The volume of pad water may also be referred to as water.

The providing at 140 additionally or alternatively may include providing the volume of pad water to decrease a potential for dissolution of the proppant, which is provided during the providing at 145, within the chelating acid blend and/or to produce and/or generate a water space, within the one or more fractures, that separates the proppant from the chelating acid blend. The providing at 140 additionally or alternatively may include providing the volume of pad water to decrease, or to decrease a potential for, dissolution of the downhole tubular and/or other components of the hydrocarbon well in and/or within the chelating acid blend.

Providing the proppant at 145 may include providing the proppant to the wellbore, to the tubular conduit, to the subterranean formation, and/or to the one or more fractures. As an example, the providing at 145 may include providing the proppant to the wellbore and/or to the tubular conduit and flowing the proppant, via the wellbore and/or via the tubular conduit, into the one or more fractures to prop the one or more fractures.

Repeating at least the portion of the methods at 150 may include repeating any suitable step and/or steps of methods 100 in any suitable order and/or with any suitable timing, or relative timing. As examples, the repeating at 150 may include repeating the providing at 105, repeating the providing at 110, repeating the providing at 115, repeating the fracturing at 120, repeating the flowing at 125, repeating the dissolving at 130, repeating the chelating at 135, repeating the providing at 140, and/or repeating the providing at 145. As another example, the repeating at 150 may include repeating at least the providing at 115, the flowing at 125, the dissolving at 130, the chelating at 135, and the providing at 140 a plurality of times to flow the chelating acid blend deep into the at least one fracture and/or to more fully stimulate the at least one fracture. As yet another example, the at least one fracture many include and/or be a first fracture, and the repeating at 150 may include repeating the fracturing at 120 to form and/or define a second fracture and repeating at least the providing at 115, the flowing at 125, the dissolving at 130, and the chelating at 135 to stimulate the second fracture. In such methods, formation and/or stimulation of the second fracture may be performed subsequent to formation and/or stimulation of the first fracture.

Waiting the threshold dissolution time at 155 may include waiting any suitable threshold dissolution time to permit and/or facilitate the dissolving at 130. Additionally or alternatively, the waiting at 155 may include waiting for complete, or at least substantially complete, reaction of the chelating acid blend within the subterranean formation and/or with the formation mineralogy. The waiting at 155 may be performed subsequent to the flowing at 125 and/or prior to the producing at 160. Examples of the threshold dissolution time include threshold dissolution times of at least 5 minutes, at least 10 minutes, at least 30 minutes, at least 1 hour, at least 6 hours, at least 12 hours, at least 1 day, at least 3 days, at least 1 week, at least 2 weeks, at least 3 weeks, at least 1 month, at least 2 months, at least 3 months, at least 4 months, at least 5 months, and/or at least 6 months.

Producing the produced fluid stream at 160 may include producing the produced fluid stream from the subterranean formation with, via, and/or utilizing the wellbore and/or the hydrocarbon well. This may include producing the produced fluid stream to remove the chelating acid blend from the subsurface region and/or to produce hydrocarbon fluids from the subterranean formation.

In some examples, and as discussed, the providing at 115 may include providing the chelating acid blend at the blend supply pressure that is sufficient to form the at least one fracture within the subterranean formation. In such examples, methods 100 may include performing the fracturing at 120 responsive to the providing at 115. Methods 100 then may include performing the providing at 140, such as to flush the chelating acid blend from the wellbore and/or to flow the chelating acid blend into, or deeper into, the at least one fracture. This may increase a length of the at least one fracture that is treated by the chelating acid blend, thereby increasing a drained volume for the at least one fracture, increasing an effective length of the at least one fracture, and/or improving fracture fluid conductivity along a greater portion of a length of the at least one fracture. Subsequent to the providing at 140, methods 100 may include performing the providing at 145 to prop the at last one fracture and/or to fill a propped region of the at least one fracture with proppant.

In a variation on these methods, the providing at 115 and the providing at 140 may be sequentially repeated, a plurality of times, prior to performing the providing at 145. Such a configuration may flow the chelating acid blend even deeper into the fracture and/or even farther from the wellbore, further increasing the length of the at least one fracture that is treated by the chelating acid blend, increasing the drained volume for the at least one fracture, increasing the effective length of the at least one fracture, and/or improving fracture fluid conductivity along an even greater portion of the length of the at least one fracture.

In additional or alternative specific examples, and prior to the providing at 115, methods 100 may include performing the providing at 105 and the fracturing at 120. In such examples, methods 100 may include performing the fracturing at 120 subsequent and/or responsive to the providing at 105. Methods 100 then may include performing the providing at 115; and, as discussed, the chelating acid blend flow rate during the providing at 115 may be less than the fracturing fluid flow rate during the providing at 105. Methods 100 then may include performing the providing at 140, such as to flush the chelating acid blend from the wellbore and/or to flow the chelating acid blend into, or deeper into, the at least one fracture. This may increase the length of the at least one fracture that is treated by the chelating acid blend, thereby increasing the drained volume for the at least one fracture, increasing the effective length of the at least one fracture, and/or improving fracture fluid conductivity along a greater portion of the length of the at least one fracture. Subsequent to the providing at 140, methods 100 may include performing the providing at 145 to prop the at last one fracture and/or to fill a propped region of the at least one fracture with proppant.

In a variation on these methods, the providing at 105 and the providing at 115 may be sequentially repeated, a plurality of times, prior to performing the providing at 140 and/or prior to performing the providing at 145. Such a configuration may increase the length of the at least one fracture, may flow the chelating acid blend even deeper into the fracture and/or even farther from the wellbore, further increasing the length of the at least one fracture that is treated by the chelating acid blend, increasing the drained volume for the at least one fracture, increasing the effective length of the at least one fracture, and/or improving fracture fluid conductivity along an even greater portion of the length of the at least one fracture.

As discussed, chelating acid blend 90 includes the acid mixture and the chelating agent. As also discussed, the acid mixture includes hydrochloric acid and hydrofluoric acid. Conventional acid stimulation operations, which may utilize hydrochloric acid and/or hydrofluoric acid, only may be effectively utilized with certain, or with specific, formation mineralogies. As an example, hydrochloric acid conventionally is utilized to stimulate subterranean formations that include at least 80% carbonate. This may be due to the fact that, in formations that include less than 80% carbonate, metal hydroxides, such as aluminum hydroxide, may precipitate from the hydrochloric acid; and these metal hydroxide precipitates may cause an undesired decrease in fracture fluid conductivity. Conversely, hydrofluoric acid conventionally is utilized to stimulate subterranean formations that do not include carbonate. This may be due to the fact that in formations that include carbonate, metal fluorides, such as calcium fluoride, may precipitate from the hydrofluoric acid; and these metal fluoride precipitates may cause an undesired decrease in fracture fluid conductivity. Mud acids, which include both hydrochloric acid and hydrofluoric acid, also have been utilized. However, these mud acids suffer from similar, or even worse, limitations regarding precipitation of metal ion complexes.

With the above in mind, a benefit of chelating acid blends 90 according to the present disclosure may be the ability to utilize the chelating acid blends to stimulate a wider variety of formation mineralogies and/or the ability to utilize the chelating acid blends without the need to tailor a specific stimulant acid to a specific formation mineralogy. This may be due to chelation of metal ions by chelating agent 72, which decreases a potential for precipitation of metal ion complexes from the chelating acid blends. Stated another way, chelating agent 72 may complex with metal ions and keep the metal ions in solution when they otherwise would form complexes that would precipitate from solution. Examples of metal ions that effectively may be maintained in solution utilizing chelating acid blends 90 include metal ions with a +2 charge, or more, including magnesium, calcium, aluminum, iron, and silicon ions. Examples of formation mineralogies that may be effectively stimulated by chelating acid blends 90 include quartz, feldspars, clays, and/or carbonates.

The acid mixtures utilized in chelating acid blends 90 may include any suitable amount and/or proportion of acid. As examples, chelating acid blends 90 may include at least 1 weight percent (wt %), at least 2 wt %, at least 3 wt %, at least 4 wt %, at least 5 wt %, at least 6 wt %, at least 8 wt %, at least 10 wt %, at least 15 wt %, at least 20 wt %, at most 25 wt %, at most 20 wt %, at most 18 wt %, at most 16 wt %, at most 14 wt % at most 12 wt %, at most 10 wt %, at most 8 wt %, and/or at most 6 wt % hydrochloric acid. As additional examples, chelating acid blends 90 may include at least 0.1 (wt %), at least 0.25 wt %, at least 0.5 wt %, at least 1 wt %, at least 1.5 wt %, at least 2 wt %, at least 3 wt %, at least 4 wt %, at least 5 wt %, at least 6 wt %, at least 8 wt %, at most 10 wt %, at most 8 wt %, at most 6 wt %, at most 5 wt %, and/or at most 4 wt % hydrofluoric acid. As another example, the acid mixtures utilized in chelating acid blends may include one or more additional acids that may be in addition to the hydrochloric acid and the hydrofluoric acid.

Chelating agent 72 may include any suitable chemical and/or compound that may be selected to decrease the potential for precipitation of metal ion complexes from the chelating acid blend upon reaction of the chelating acid blend with the formation mineralogy of the subterranean formation and/or that may be selected to decrease a reaction rate of the acid mixture with the formation mineralogy. As an example, chelating agent 72 may include and/or be an amino acid. Examples of the amino acid include alanine, glycine, leucine, aspartic acid, glutamic acid, arginine, and/or lysine. As another example, chelating agent 72 may include and/or be citric acid. As yet another example, chelating agent 72 may include and/or be a phosphonate. As another example, chelating agent 72 may include and/or be an aminopolycarboxylic acid. As additional examples, chelating agent 72 may include and/or be ethylenediaminetetraacetic acid (EDTA), hydroxyl ethylenediaminetetraacetic acid (HEDTA), and/or hydroxyethyl amino carboxylic acid (HACA).

Chelating acid blends 90 may include any suitable amount and/or proportion of chelating agent 72. As examples, chelating acid blends 90 may include at least at least 1 wt %, at least 2 wt %, at least 4 wt %, at least 6 wt %, at least 8 wt %, at least 10 wt %, at least 15 wt %, at least 20 wt %, at least 25 wt %, at least 30 wt %, at least 40 wt %, at most 80 wt %, at most 70 wt %, at most 60 wt %, at most 50 wt %, at most 40 wt %, at most 35 wt %, at most 30 wt %, at most 25 wt %, at most 20 wt %, and/or at most 15 wt % chelating agent 72. As another example, each unit volume of chelating acid blend may include a number of moles of acidic protons and a number of moles of chelating agent, and the number of moles of chelating agent may be at least two times larger than the number of moles of acidic protons. Such a configuration may permit and/or facilitate chelating of all, or of at least substantially all, metal ions released into solution during chemical interaction between the chelating acid blend and the formation mineralogy.

It is within the scope of the present disclosure that chelating acid blends 90, according to the present disclosure, may include and/or be single-phase solutions and/or single-phase aqueous solutions of the acid mixture and the chelating agent. Such a configuration may decrease a size and/or horsepower of pumps needed to provide the chelating acid blends to the subterranean formation when compared to prior art acid stimulation formulations that often include two or more phases in the form of foams and/or suspensions.

It is also within the scope of the present disclosure that one or more components of the acid blend may be encapsulated in a coating material and/or contained within a contained volume that is defined by the coating material. As examples, an entirety of the acid blend, the hydrochloric acid, the precursor material, and/or the hydrofluoric acid may be encapsulated in the coating material. The coating material, when present, may be configured to dissolve within a fluid that extends within the subterranean formation, such as hydrocarbon fluids 7. Such a configuration may decrease a potential for reaction of chelating acid blends 90 with one or more other components that may be present within subsurface region 4 prior to the chelating acid blends reaching fracture 8 and/or a desired region of fracture 8. As a more specific example, such a configuration may decrease a potential for reaction between the chelating acid blends and metals that may form and/or define downhole tubular 14 and/or one or more other metallic tubulars of the hydrocarbon well.

In some examples, chelating acid blend 90 may include hydrochloric acid, hydrofluoric acid, and a chelating agent in the form of lysine. Such a configuration also may slow a reaction rate of the chelating acid blend, thereby decreasing a potential for reaction or for substantial reaction, of the chelating acid blend within and/or proximate wellbore 12 and/or increasing a length of fractures 8 that is treated, or that exhibits improved fracture fluid conductivity, due to chemical interaction with the chelating acid blend.

As discussed, hydrocarbon wells 10 and methods 100, which are disclosed herein, may provide distinct benefits over conventional acid stimulation operations. These benefits may be at least partially due to the inclusion of the chelating agent within chelating acid blends, according to the present disclosure. Inclusion of the chelating agent may increase a number and/or chemistry of formation mineralogies that may be acid treated when compared to conventional acid stimulation operations and/or may decrease a potential for precipitation of metal complexes within the subterranean formation.

Returning to FIG. 1, a further benefit of hydrocarbon wells 10 and methods 100, according to the present disclosure, may relate to the ability of methods 100 to produce fractures 8 that produce hydrocarbon fluids 7 over a longer length thereof. As an example, conventional propping operations generally only are able to prop a fraction of the overall length of fractures 8. This fraction of the overall length of fractures 8 may be referred to herein as a propped region 9 of fractures 8. The inability of conventional propping operations to prop an entirety, or at least a greater length, of fractures 8 may be caused by the size of proppant particles utilized in the propping operations and/or by pumping limitations. Stated another way, proppant particles may be sized such that they physically cannot flow into an entirety of the length of fractures 8 and/or the pumps that supply the proppant only may be able to provide a threshold pressure differential without causing damage to the hydrocarbon well and/or to the subterranean formation. As such, a significant portion of the length of fractures 8 may not include proppant, or may be unpropped. These regions of the fractures may close off subsequent to performing conventional propping operations and/or may have a very low fracture fluid conductivity.

In contrast with the above, and in addition to utilizing conventional propping operations, hydrocarbon wells 10 and/or methods 100, according to the present disclosure, utilizing chelating acid blends 90 to stimulate a greater fraction of the length of fractures 8. As an example, FIG. 1 illustrates a chelating acid blend-treated region 91 of fractures 8 and shows that this chelating acid blend-treated region 91 may be significantly larger than propped region 9.

As illustrated in FIGS. 2-3 and discussed herein with reference thereto, hydrocarbon wells 10 and/or methods 100, according to the present disclosure, may increase fracture fluid conductivity of fractures 8 within chelating acid blend-treated region 91. This may permit and/or facilitate production of hydrocarbon fluids 7 from subterranean formation 6 via a greater fraction of the length of fractures 8 and/or significantly increase production of the hydrocarbon fluids from the subterranean formation. As examples, the chelating acid blend-treated region 91 may be at least 2, at least 4, at least 6, at least 8, or at least 10 times larger than propped region 9.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B")

may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

INDUSTRIAL APPLICABILITY

The systems and methods disclosed herein are applicable to the hydrocarbon well utilization and/or completion industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions, and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements, and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

What is claimed is:

1. A chelating acid blend formulated to stimulate a subterranean formation having a formation mineralogy, the chelating acid blend comprising:
   an acid mixture including:
   (i) hydrochloric acid, wherein the hydrochloric acid comprises at least 5 weight percent of the chelating acid blend; and
   (ii) hydrofluoric acid, wherein the hydrofluoric acid comprises at least 0.5 weight percent of the chelating acid blend;
   a chelating agent selected from one or more amino acids having at least one primary amine, the amino acid selected from the group consisting of alanine, leucine, aspartic acid, glutamic acid, arginine, lysine, glycine, and any combination thereof; and
   a coating material that encapsulates the acid mixture and the chelating agent, wherein the coating material is configured to dissolve within hydrocarbon fluids.

2. The chelating acid blend of claim 1, wherein the chelating acid blend includes at least 8 weight percent hydrochloric acid.

3. The chelating acid blend of claim 1, wherein the chelating acid blend includes at least 2 weight percent hydrofluoric acid.

4. The chelating acid blend of claim 1, wherein the chelating agent further includes citric acid.

5. The chelating acid blend of claim 1, wherein the chelating agent further includes a phosphonate.

6. The chelating acid blend of claim 1, wherein the chelating agent further includes an aminopolycarboxylic acid.

7. The chelating acid blend of claim 1, wherein the chelating agent further includes ethylenediaminetetraacetic acid (EDTA).

8. The chelating acid blend of claim 1, wherein the chelating agent includes hydroxyl ethylenediaminetetraacetic acid (HEDTA).

9. The chelating acid blend of claim 1, wherein the chelating agent includes hydroxyethyl amino carboxylic acid (HACA).

10. The chelating acid blend of claim 1, wherein the chelating agent comprises at least 2 weight percent of the chelating acid blend.

11. The chelating acid blend of claim 1, wherein the chelating agent comprises at least 20 weight percent of the chelating acid blend.

12. The chelating acid blend of claim 1, wherein the chelating agent comprises at most 40 weight percent of the chelating acid blend.

13. The chelating acid blend of claim 1, wherein each unit volume of the chelating acid blend includes a number of moles of acidic protons and a number of moles of chelating agent, wherein the number of moles of chelating agent is at least two times larger than the number of moles of acidic protons.

14. The chelating acid blend of claim 1, wherein the chelating acid blend is an aqueous solution of the acid mixture and the chelating agent.

15. A method of stimulating a subterranean formation, the method comprising:
- providing the chelating acid blend of claim 1 to a wellbore of a hydrocarbon well that extends within the subterranean formation;
- flowing the chelating acid blend into the subterranean formation via the wellbore;
- dissolving a fraction of the formation mineralogy of the subterranean formation with the acid mixture of the chelating acid blend to increase a fracture fluid conductivity of a fracture that extends within the subterranean formation; and
- chelating, with the chelating agent, poly-valent metal ions released during the dissolving to decrease a potential for precipitation of metal complexes, which include the poly-valent metal ions, within the subterranean formation.

16. A hydrocarbon well, comprising:
- a wellbore that extends within a subterranean formation;
- a downhole tubular that extends within the wellbore, wherein the downhole tubular defines a tubular conduit and a perforation;
- a fracture extending from proximate the perforation and into the subterranean formation; and
- the chelating acid blend of claim 1 positioned within the fracture.

* * * * *